United States Patent [19]
Nacman et al.

[11] Patent Number: 5,444,239
[45] Date of Patent: Aug. 22, 1995

[54] FIBER OPTIC SCANNING BEAM DETECTOR

[75] Inventors: Aron Nacman, Penfield; James J. Appel, Rochester, both of N.Y.; Andrew M. Strauch, Yokohama, Japan

[73] Assignee: Xerox Corporation, Stamford, Conn.

[21] Appl. No.: 217,822

[22] Filed: Mar. 25, 1994

[51] Int. Cl.[6] ............................................. G01J 1/20
[52] U.S. Cl. ................................. 250/235; 359/216; 358/484
[58] Field of Search ............................... 250/234–236, 250/227.11, 227.31; 358/481, 484, 494; 348/197; 359/216, 212, 223

[56] References Cited

U.S. PATENT DOCUMENTS

| | | | |
|---|---|---|---|
| 4,010,364 | 3/1977 | Fuwa | 358/484 |
| 4,071,754 | 1/1978 | Roulund | 250/227 |
| 4,179,664 | 12/1979 | Bedwell | 327/12 |
| 4,386,272 | 5/1983 | Check, Jr. et al. | 250/236 |
| 4,800,270 | 1/1989 | Blais | 250/235 |
| 5,018,808 | 5/1991 | Meyers et al. | 359/223 |
| 5,210,634 | 5/1993 | Iwama | 359/216 |
| 5,373,154 | 12/1994 | Chen | 250/235 |

Primary Examiner—Stephone B. Allen

[57] ABSTRACT

A fiber optic system is used in a laser ROS scanning system to generate a start of scan signal. In one embodiment, a single optical fiber is positioned at the beginning of a scan line sweep. The fiber transmits a portion of a scan beam energy to a photodetector located on a local electronics board. The photodiode generates an output signal which is sent as an input to a high speed comparator. A second input to the comparator is a divided down and delayed analog of the photodetector output signal. The comparator compares the two voltage wave forms and generates electrical signals at the precise time the two wave forms intersect or crossover. The comparator output is used to initiate the SOS signal of a gas or laser diode ROS.

3 Claims, 4 Drawing Sheets

FIBER OPTIC SCANNING BEAM DETECTOR

BACKGROUND AND MATERIAL DISCLOSURE STATEMENT

The invention broadly relates to a Raster Output Scanner (ROS) imaging system, and, more particularly, to a means and method for generating timing signals responsive to the detection of a scanning beam, at an image plane, crossing a fiber optic detector.

In conventional ROS systems, an intensity modulated light beam generated by a gas or diode laser is repetitively scanned across the surface of a photosensitive image plane to form a latent image of a document or the like represented by input binary data. Each scan line comprises composite images of individual pixels representing on and off states of the laser. These pixels must be aligned from scan to scan in the vertical or fast-scan direction; failure to do so results in the phenomenon known as "jitter". It is known in the prior art to position photodetectors at a start of scan line at a predetermined distance from the recording surface. Exemplary of the known detectors is a slit detector which compares the amplitude of a photodiode output signal against a predetermined fixed reference voltage. When the amplitude of the diode signal passes through this reference threshold, an indicator signal is generated. Also known is the so-called split detector which utilizes a two photodiode-dual comparator configuration to compensate for variations in beam output power. In operation, the sweep of the beam over the first detector sets an associated first comparator. The output of this first comparator is supplied as a reference for the second comparator, which is thereafter triggered by the sweep of the beam across the second diode detector to provide the indicator signal. An example of a split detector is disclosed in U.S. Pat. No. 4,386,272.

For many high speed, high resolution ROS systems, a solid state laser diode or a HeNe laser are the preferred mechanism for generating the recording beams. As is well known, the power output of these lasers varies in amplitude over time. The conventional slit detector when used with a laser scanning system is subjected to jitter since the signal generated by the detector will track, in amplitude, the gaussian shape of the beam as it sweeps across the face of the detector. The outputs produced by beams having different power levels will, necessarily, pass through the fixed reference level at different relative times (because of the photodide output rise time constant), resulting in the generation of indicator signals at different points in time in relation to the time reference base of the sweep of the beam. Since the synchronization of the scanner system is keyed to the time difference between the generation of the indicator signal and the transit time of the beam from the detector location to the targeted edge of the recording medium, this differential triggering effects a translation of information horizontally, or in the scanned direction, from line to line so that the picture elements do not align properly in the fast-scan direction. The split detector generates an output signal when the laser beam crosses between the two split detector sites. Since the time at which the beam crosses the two split detector sites is dependent on the split detectors physical spacing and not a fixed voltage reference, the output signal is stable (in time) independent of the beam power level. In other words, the split detector generates a signal which does not vary in time when the diode intensity varies. Both the slit detector and the split detector are configured in the same fashion; the detector is located on a remote detector board which is positioned adjacent the imaging surface. The light impinging on the detector is converted to an electrical signal which is then sent over wires back to a local electronics board which contains the circuitry to shape and process the detector signal and to generate the appropriate start pulse signals to the laser.

A third detection method is known in the art wherein a scanning laser position is sensed by placing a fiber optic bundle in the path of the scanning beam. The fiber optic bundle transmits the incident light to the local electronics board. The conveyed light energy is incident on an indicia as, for example, disclosed in U.S. Pat. No. 4,071,754, or on a photodetector, located on a local board. The detector converts the light energy into an electrical signal which is then processed to provide signals to the laser. Fiber optic detectors have several advantages over the split and slit detectors; they are less expensive, provide noise immunity and have simple mechanical mounting. Lower cost is realized because a separate scan detector circuit board is not needed and because the cable that provides power and signals to and from the remote scan detector board is not needed. Noise immunity is realized because the laser printer environment is electrically noisy (EMI, RFI) and the remote scan detector board has to get power and send the detected signal over wires through this noisy environment. The fiber optic system sends the signal as light energy through the noisy environment back to the local electronics board where the signal can be converted to an electronic signal. The local board would be in a controlled environment (shielded) where noise would be lower. Further, the mechanical mounting of the remote system is difficult because the scan detector board is relatively large. The fiber optic is very small and so is easier to locate and mount. Since the optical fiber can only transmit beam energy and not position, use with the split detector would be impossible and use with a conventional slit detector system would not be capable of generating a start of scan signal that does not vary in time when the scanning laser intensity changes.

The present invention is therefore directed to a means and method for generating a start of scan signal using fiber optic detection means which does not vary in time with scanning intensity changes of the laser diodes. The invention is based upon the insight of simulating the junction of the split detector by introducing a second, time delayed signal which corresponds to the second signal generated at the second photosite of a split detector. More particularly, the invention relates to a fiber optic scanning beam detector comprising fiber optic means positioned in the path of a periodically sweeping beam of light, said fiber optic means transmitting energy from said intercepted light onto a photosensor thereby causing said photo sensor to generate an electrical signal V1 corresponding to the intensity of said detected light, circuit means for dividing said electrical signal to form a second electrical signal, V2, said formation of said second electrical signal delayed in time from formation of said first electrical signal, and comparator means for comparing said first and second electrical signals and for generating a third electrical signal, V3, upon a detection of a crossover point between said first and second signal.

DESCRIPTION OF THE INVENTION

Figure 1:
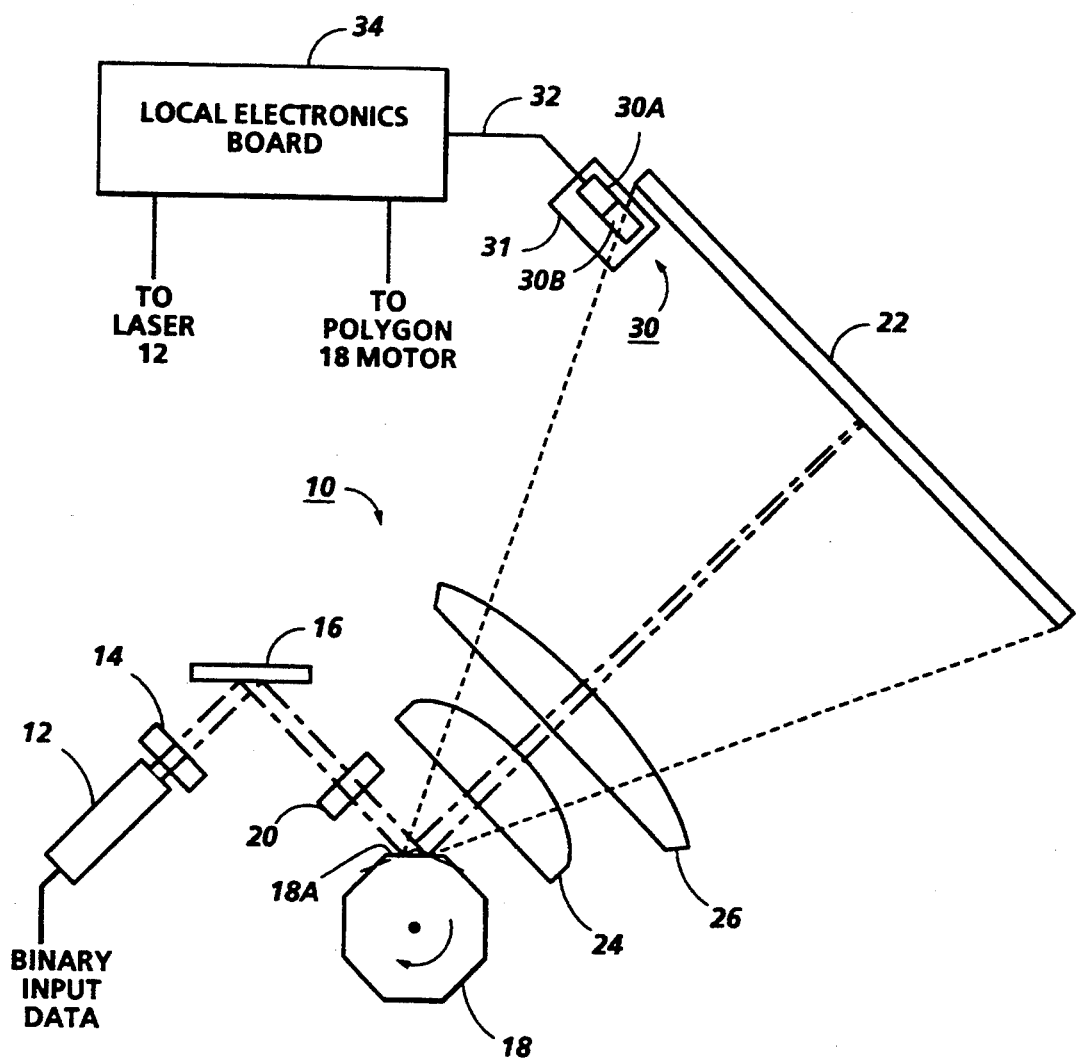
FIG. 1 is a top view, in the tangential plane, of a prior art ROS scanner using a diode laser and split detector for SOS detection.

FIG. 1 is a top view of a prior art laser diode ROS scanner which utilizes a conventional split detector to generate an SOS signal. Referring to FIG. 1, scanner 10 comprises a self-modulating diode laser 12 which receives the binary input image data. Optical system 14 provides conventional collimation and beam expansion of the modulated output. The collimated output from system 14 is reflected by folding mirror 16 and is focused onto facets of rotating polygon 18, by positive cylindrical lens 20. Lens 20 is also usually aligned to optically correct for polygon-induced sagittal beam position error, (wobble error). The reflected rays from a facet, e.g. facet 18A of polygon 18 are focused in the fast scan direction (tangential plane) at image plane 22 by Fθ lens elements 24, 26.

Figure 2:
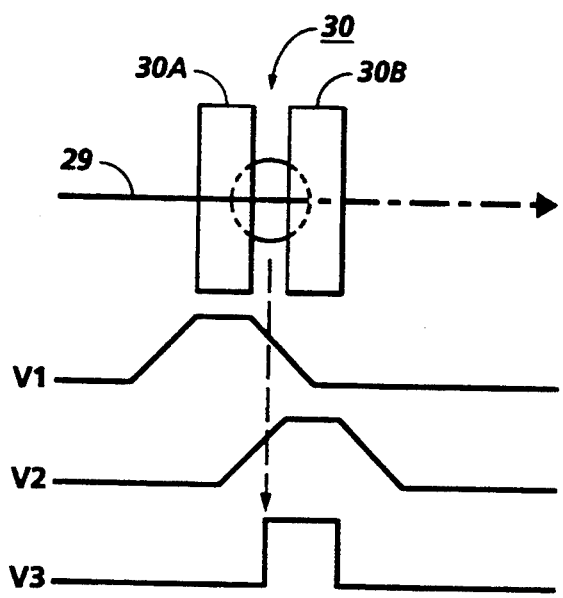
FIG. 2 shows the electrical output signals generated by the split detector of FIG. 1.

As the beam scans across image plane 22 light impinges on split detector 30 mounted on remote scan detector board 31. FIG. 2 shows the split detector 30 and the voltage wave forms V1, V2, and V3 generated when the scanning beam 29 crosses two photosites of the detector.

In the split detector system there are two photosites 30A, 30B separated by a small space. As a scanning beam 29 scans across the two photosites two separate electrical signals (V1, V2) are generated separated by a time delay due to the space between the photosites. The two signals are sent along wires, processed by a circuit on local electronics board 34 to generate a low jitter edge signal V3 which is stable independent of the scanning laser intensity. The circuit generates a signal when V1 and V2 cross which is when the beam is crossing between the photosites. This split detector system illustrates the aforementioned problem since detector 30 requires installation on a remote board 31 adjacent the imaging surface; the output signals are generated in a noisy environment and wires are needed to convey the output signal back to the local electronics board in the feedback loop.

Figure 3:
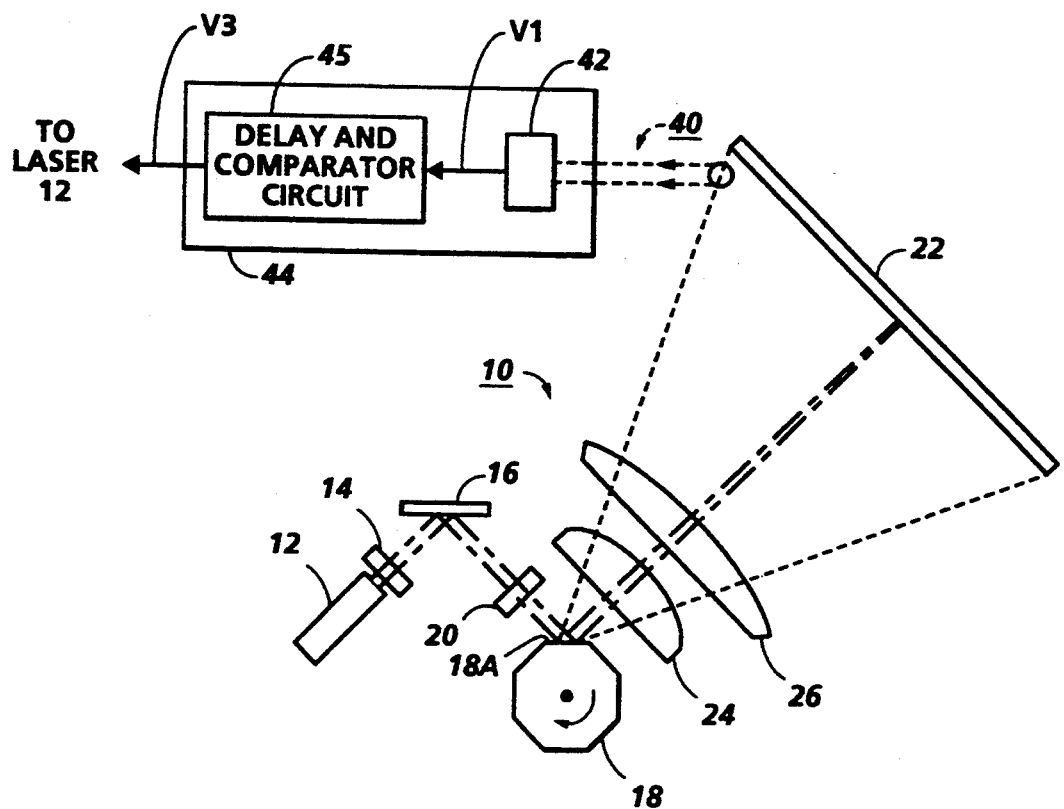
FIG. 3 is a top view of a modified version of the scanner of FIG. 1 showing the fiber optic SOS detection method of the present invention.
Figure 4:
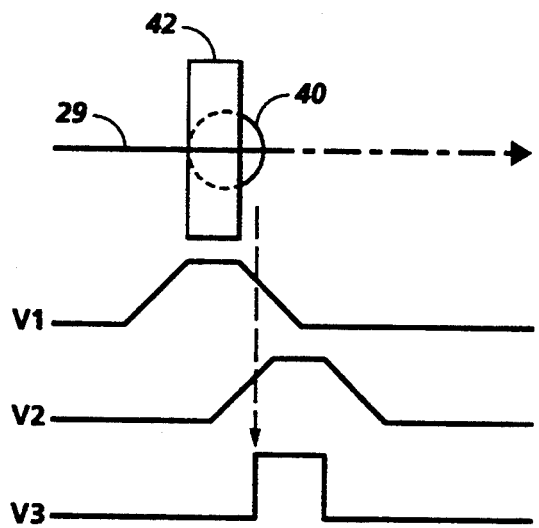
FIG. 4 shows the schematic electrical signals generated by the SOS detection system shown in FIG. 3.
Figure 5:
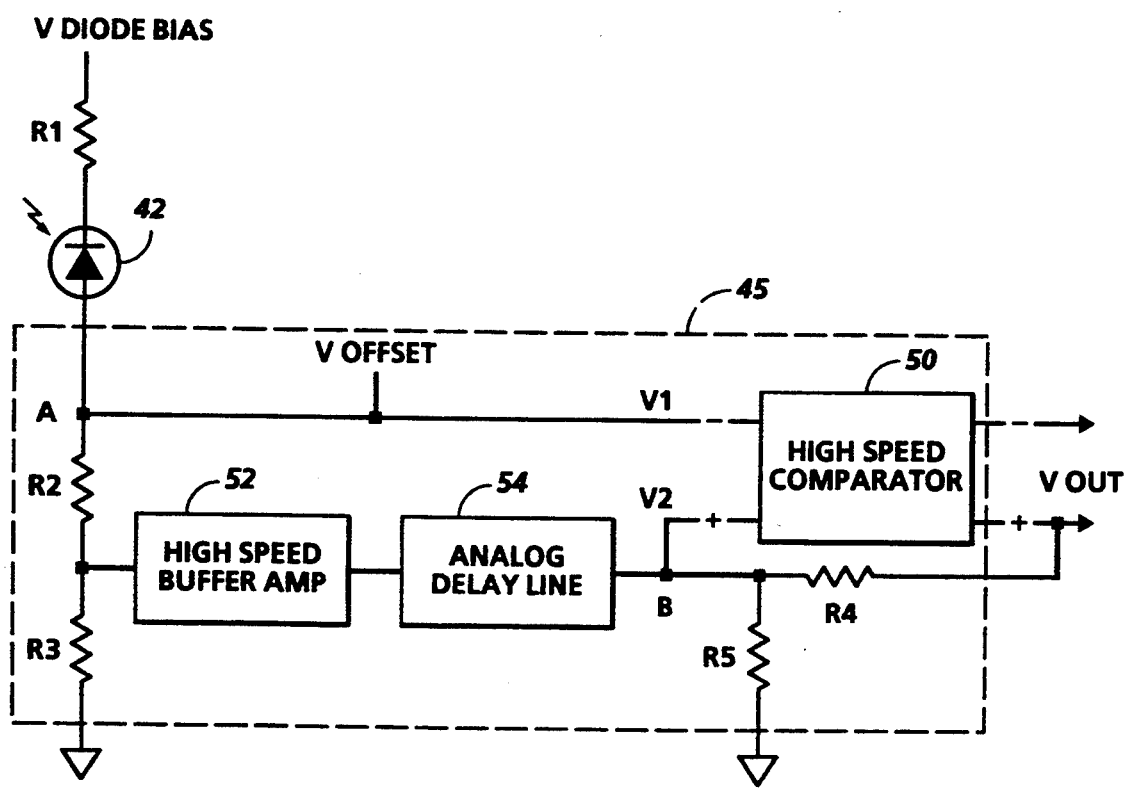
FIG. 5 shows circuitry used to generate a second delayed signal following generation of a first detected signal.

According to the invention, a "split" fiber detector signal system is realized by positioning an optical fiber at the SOS location and transmitting the incident light energy to a single photo detector located on the local electronics board. While a single optical fiber is shown it will be understood that multiple fibers bundled together may also be used. Circuitry is added which produces two separate electrical signals which are equivalent to the two signals V1, V2 of the prior art split detector. The first signal is generated when the beam transmitted through the optical fiber is incident on the single site photo detector; the second signal is generated following a predetermined time delay as will be seen. FIG. 3 shows the prior art system of FIG. 1 modified by replacing split detector 30 on board 31 with an optical fiber 40. FIG. 4 shows the SOS signals generated when scanning beam 29 crosses fiber 40 and the light is transmitted to detector 42. Referring to FIGS. 3 and 4, fiber 40 delivers light to a single photosite detector 42 mounted on local electronic board 44. Output signal V1 is generated by detector 42 as it detects the beam of light emerging from the output and the fiber 40. Signal V1 is sent to delay and comparator circuits 45 shown in greater detail in FIG. 5. Referring to FIG. 5, output signal V1 generated by detector 42 is sent as one input to high speed comparator 50. This signal is also sent through high speed buffer amp 52 and analog delayed line 54 to be processed into a second delayed signal V2 at the input to comparator 50. V2 is thus seen as the analog of the signal V2 of the split detector (of FIG. 2). These two signals, V1 and V2, are operated on in comparator 50 to generate the low jitter edge signal V3 which is stable independent of any laser intensity variations. Additional circuitry and timing diagrams are shown on FIGS. 6 and 7.

Figure 6:
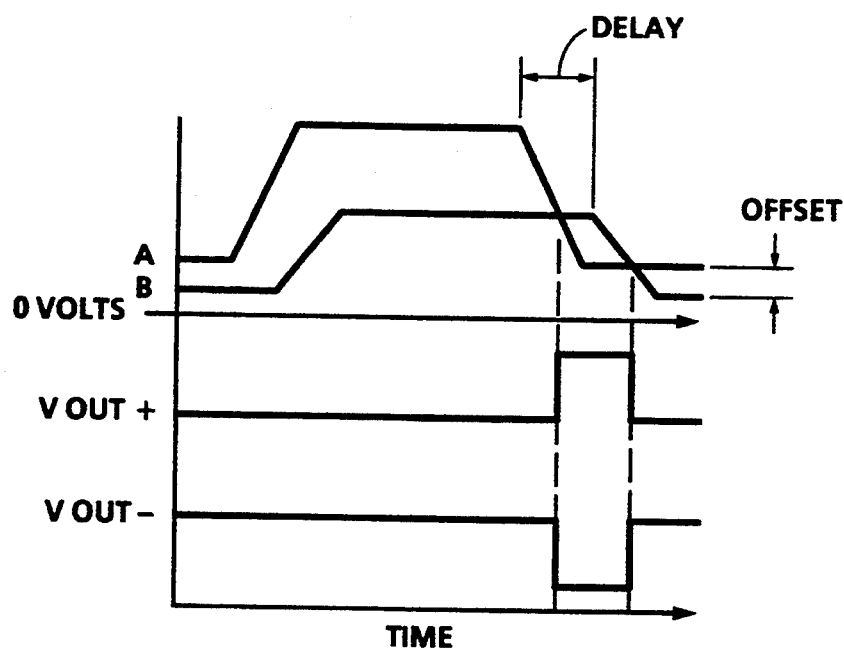
FIG. 6 is the timing diagram for the circuit of FIG. 5.

Referring to FIGS. 4–6, the detector 42 is back biased for maximum speed through resistor R1 to the diode bias voltage. A small offset voltage is applied to the negative input terminal of a high speed comparator 50 so that the comparator output (Vout+) will initially start at a logic low state. Because of the voltage divider, formed by resistors R2 and R3, only a fraction of the offset voltage will get to the positive input terminal of the comparator. The voltage divider is set up so that ½ of the voltage at point A appears at point B after amplification by buffer amp 52, and with a time delay determined by the value of the analog delay line 54. As the scanning beam 29 begins to cross the detector 42, the voltage starts to rise at A. Since only half the voltage appears at B (with a time delay) the output of the comparator (Vout+) stays in the low state. When the scanning beam is directly on the photodetector, the voltage at A and B are at their maximum. As the scanning beam begins to fall off the photo diode site, the voltage at A begins to drop but the voltage at B does not immediately change because of the time delay. Eventually the voltage at A drops below the voltage at B and the output of the comparator (Vout+) goes to the high state. There is hysteresis to prevent oscillations by resistors R4 and R5 so that when the comparator output (Vout+) goes high, the positive input terminal to the comparator gets more voltage to lock in the state change. When the time delay is over, the voltage at B begins to drop and eventually drops below the voltage at A so the output of the comparator (Vout+) switches back to the low state. The comparator output is thus the low jitter edge signal V3.

Figure 7:
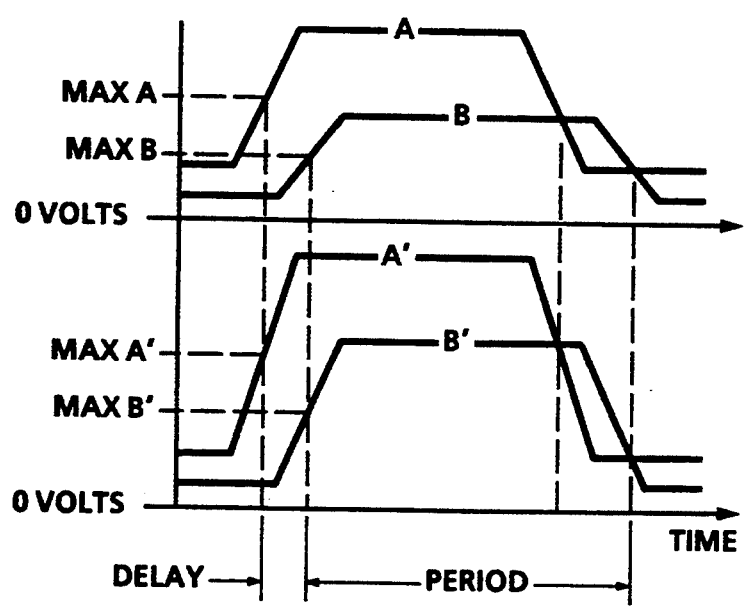
FIG. 7 shows a comparison of two circuit timing diagrams for two different laser output intensities.

The circuitry shown in FIG. 5 make the repeatability of the scan detected pulse rising edge not change in time when the diode intensity changes. This is shown in FIG. 7 where a comparison is made of two different laser intensities. Because the resistor voltage divider (R2, R3) is set for ½, the crossing trigger point will always be at the ½ max point. The waveforms labeled A', B' represents a case where the laser power is double the waveforms shown in A, B. Since the fall time of A or A' is independent of the maximum voltage (laser power), A and A' will always cross B and B' at the ½ max point which is always the same point in time.

While the embodiment disclosed herein is preferred, it will be appreciated from this teaching that various alternative, modifications, variations or improvements therein may be made by those skilled in the art, which are intended to be encompassed by the following claims:

What is claimed is:

1. A fiber optic scanning beam detector comprising: fiber optic means positioned in the path of a periodically sweeping beam of light, said fiber optic means transmitting energy from said intercepted light onto a photosensor thereby causing said photo sensor to generate an electrical signal V1 corresponding to the intensity of said detected light, circuit means for dividing said electrical signal to form a second electrical signal, V2, said formation of said second electrical signal delayed in time from formation of said first electrical signal, and comparator means for comparing said first and second electrical signals and for generating a third electrical signal, V3, upon a detection of a crossover point between said first and second signal.

2. Apparatus for detecting a scanning beam of radiant energy from a radiant energy source at a predetermined position adjacent a recording medium and along a scanning beam path and for providing a feedback signal to said radiant energy source which is used for establishing a start of scan position of said scanning beam on said recording medium, said apparatus comprising:

at least one optical fiber with a light receiving end positioned at said predetermined position, said scanning beam entering said fiber receiving end and transmitted through said fiber to a discharge end of said fiber, a photodetector positioned so as to receive the light from said fiber discharge end, said photodetector providing an output voltage V1 when irradiated by light from said fiber discharge end, delay and comparator circuit means for dividing and delaying said voltage V1 to form a second voltage V2, voltage V2 having the same rise and fall waveform characteristics as V1 but delayed by a predetermined time interval, and a comparator means for comparing said voltage waveforms V1 and V2 and generating an output voltage V3 wherein said waveforms intersect in time.

3. The apparatus of claim 2, wherein said radiant energy source is of a diode laser and wherein said voltage V3 does not vary in time with scanning intensity changes of said laser diode.

* * * * *